United States Patent
Wang et al.

(10) Patent No.: US 9,081,643 B2
(45) Date of Patent: Jul. 14, 2015

(54) SYSTEM AND METHOD FOR EFFICIENTLY UPDATING FIRMWARE FOR NODES IN A MESH NETWORK

(71) Applicant: Silver Spring Networks, Inc., Redwood City, CA (US)

(72) Inventors: Jennifer Wang, Palo Alto, CA (US); Evan McClure, Sunnyvale, CA (US)

(73) Assignee: Silver Sring Networks, Inc., Redwood City, CA (US)

( * ) Notice: Subject to any disclaimer, the term of this patent is extended or adjusted under 35 U.S.C. 154(b) by 209 days.

(21) Appl. No.: 13/624,837

(22) Filed: Sep. 21, 2012

(65) Prior Publication Data

US 2014/0089912 A1 Mar. 27, 2014

(51) Int. Cl.
*G06F 9/44* (2006.01)
*G06F 9/445* (2006.01)

(52) U.S. Cl.
CPC .................................... *G06F 8/65* (2013.01)

(58) Field of Classification Search
CPC ............................................................ G06F 8/65
USPC .................................................................. 717/173
See application file for complete search history.

(56) References Cited

U.S. PATENT DOCUMENTS

| 2009/0235246 A1* | 9/2009 | Seal et al. ................ 717/173 |
| 2012/0102478 A1* | 4/2012 | Jeong .......................... 717/170 |
| 2013/0212572 A1* | 8/2013 | Archer et al. .............. 717/171 |
| 2014/0028468 A1* | 1/2014 | Grady et al. ............ 340/870.03 |

OTHER PUBLICATIONS

"JUNG (the Java Universal Network/Graph Framework)"; Wikipedia.com website; Nov. 8, 2011.*
"General Packet Radio Service (GPRS)"; Wikipedia.com website; Nov. 21, 2011.*
Singh et al.; "Cluster—Based Routing Scheme for Wireless Mesh Networks"; ICACT2011; Feb. 2011.*

* cited by examiner

*Primary Examiner* — Qing Chen
*Assistant Examiner* — Clint A Thatcher
(74) *Attorney, Agent, or Firm* — Artegis Law Group, LLP

(57) ABSTRACT

A technique for providing an improved way to update the nodes of a wireless mesh network is described. An upgrade engine executing on a server connected to the wireless mesh network determines a topology of the network, subdivides the network into a plurality of clusters based on the topology of the network, and seeds a small number of nodes within each cluster. The upgrade engine manages the upgrade process, notifying particular nodes within each cluster when to search for an upgrade package (e.g., an image of a new firmware) stored in an adjacent node. The upgrade engine also monitors success and failure of each node and delivers the upgrade package to a node directly when the node fails to download the upgrade package from an adjacent node within the network.

21 Claims, 8 Drawing Sheets

SYSTEM AND METHOD FOR EFFICIENTLY UPDATING FIRMWARE FOR NODES IN A MESH NETWORK

BACKGROUND OF THE INVENTION

1. Field of the Invention

Embodiments of the present invention relate generally to wireless digital communication systems and, more specifically, to a system and method for efficiently updating firmware for nodes in a mesh network.

2. Description of the Related Art

A conventional wireless mesh network includes a plurality of nodes, each incorporating a network interface. A given node may transmit payload data to one or more other nodes via the network interface. The node may originate the payload data or forward the payload data on behalf of a different node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network. A given node may send payload data directly to a corresponding access point. Additionally, the node may forward payload data to the access point on behalf of one or more other nodes within the wireless mesh network. The access point collects payload data for various nodes within the wireless mesh network and forwards the payload data to the related service system through some form of system network such as a wide-area network (WAN).

A network system includes a plurality of wireless mesh networks, where each wireless mesh network may include an arbitrary number of nodes and access points. At least one access point within each wireless mesh network bridges communications for the nodes within the respective wireless mesh network. In this way, the related service system may reach any number of access points, where each access point in turn is in communication with a plurality of nodes. The number of access points and nodes in a given wireless mesh network may be fixed, with each access point configured to bridge data communications for a fixed group of nodes. The number of nodes serviced by an access point may be fixed such that the access point can receive the payload data for all corresponding nodes, even under poor communications conditions.

During the life of the network, nodes within the network may need to be updated. For example, each node may include firmware that controls the function of the node. The updated firmware may include software changes implemented by the manufacturer of the node to fix bugs in the operation of the node or improve the functionality of the node. Because the nodes of the wireless mesh network are typically deployed at remote locations, the related service system may be configured to update the firmware in the nodes of the wireless mesh network by transmitting a copy of the software instructions to each of the nodes.

One disadvantage of this approach is that transmitting a single copy of the firmware to each node in the wireless mesh network increases network traffic transmitted via the access point. Consequently, normal network operations may be interrupted due to high bandwidth requirements of the firmware update operation. This problem is magnified because each access point bridges communications between nodes in the wireless mesh network and the related service system, creating a bottleneck in communications.

As the foregoing illustrates, what is needed in the art is a more efficient technique for efficiently performing a network-wide update of firmware for nodes in a mesh network.

SUMMARY OF THE INVENTION

One embodiment of the present invention sets forth a computer-implemented method for upgrading nodes within a network. The method includes the steps of discovering a plurality of nodes connected to the network, dividing the plurality of nodes into one or more clusters of nodes based on a topology of the network, and, for each cluster of nodes, selecting a subset of seed nodes within the cluster of nodes. The method further includes the steps of, for each cluster of nodes, transmitting a software update to each seed node in the subset of seed nodes and, for each seed node in the subset of seed nodes, notifying a set of adjacent nodes associated with the seed node to begin polling nodes in the network to locate a copy of the software update.

Other embodiments include, without limitation, a computer-readable medium that includes instructions that enable a processing unit to implement one or more aspects of the disclosed methods as well as a system configured to implement one or more aspects of the disclosed methods.

One advantage of the disclosed approach is that managing the search process for each of the nodes at a central location enables the upgrade engine to efficiently manage a distributed upgrade process while still allowing the upgrade engine to deal with network failures as they occur by directly transmitting a copy of the upgrade package to any nodes that cannot locate a copy of the upgrade package from another node in the wireless mesh network. This central management function reduces the time for upgrading every node within the wireless mesh network and ensures full deployment of the upgrade without large increases in network traffic at the access points or long delays due to inefficient propagation of the upgrade package within the wireless mesh network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
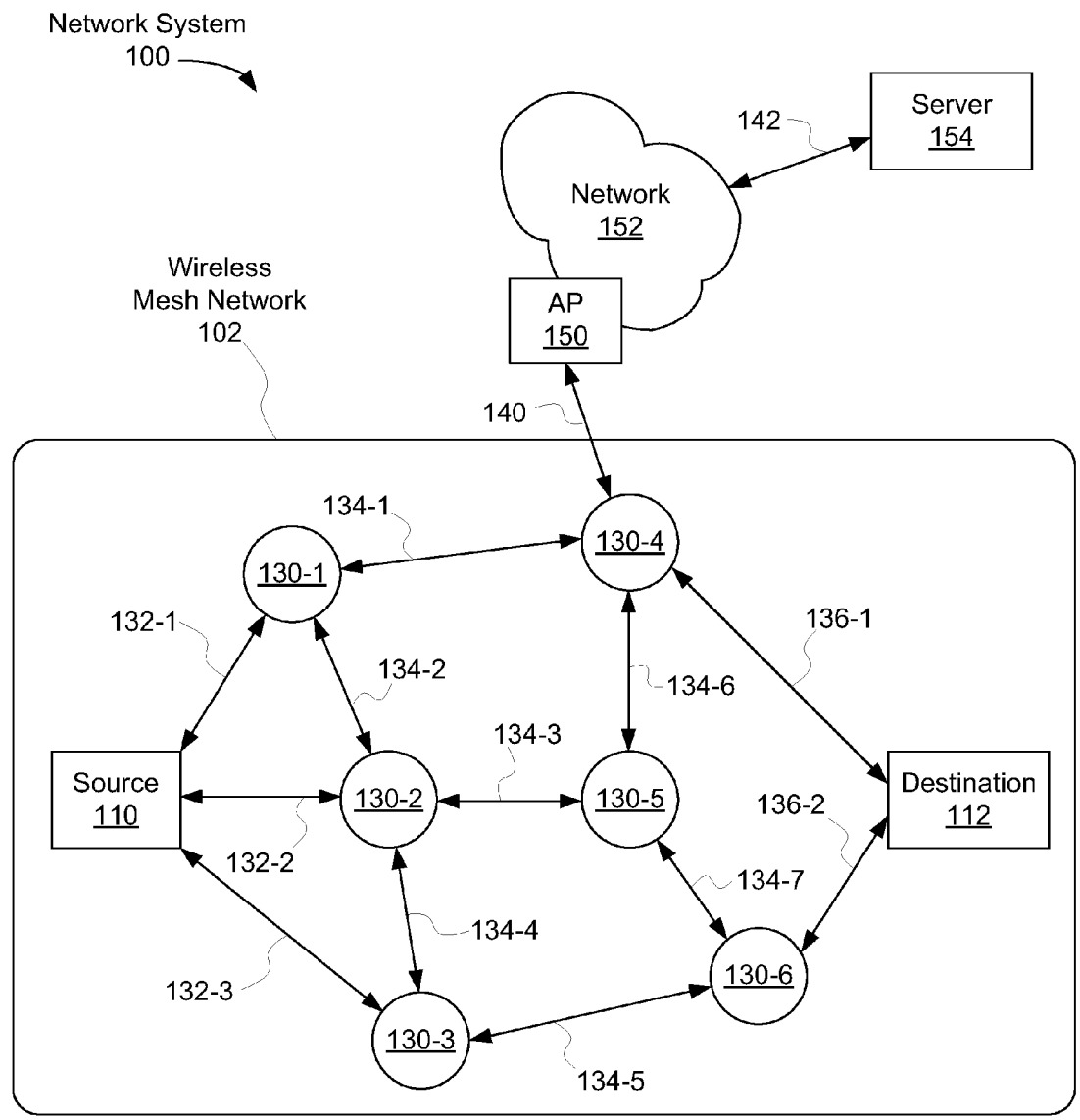
FIG. 1 illustrates a network system, according to one embodiment of the invention.

FIG. 1 illustrates a network system 100, according to one embodiment of the invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address. Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

As shown, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 may be coupled to the server 154 via communications link 142. The access point 150 is coupled to the network 152, which may comprise any wired, optical, wireless, or hybrid network configured to transmit payload data between the access point 150 and the server 154. In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

Figure 2A:
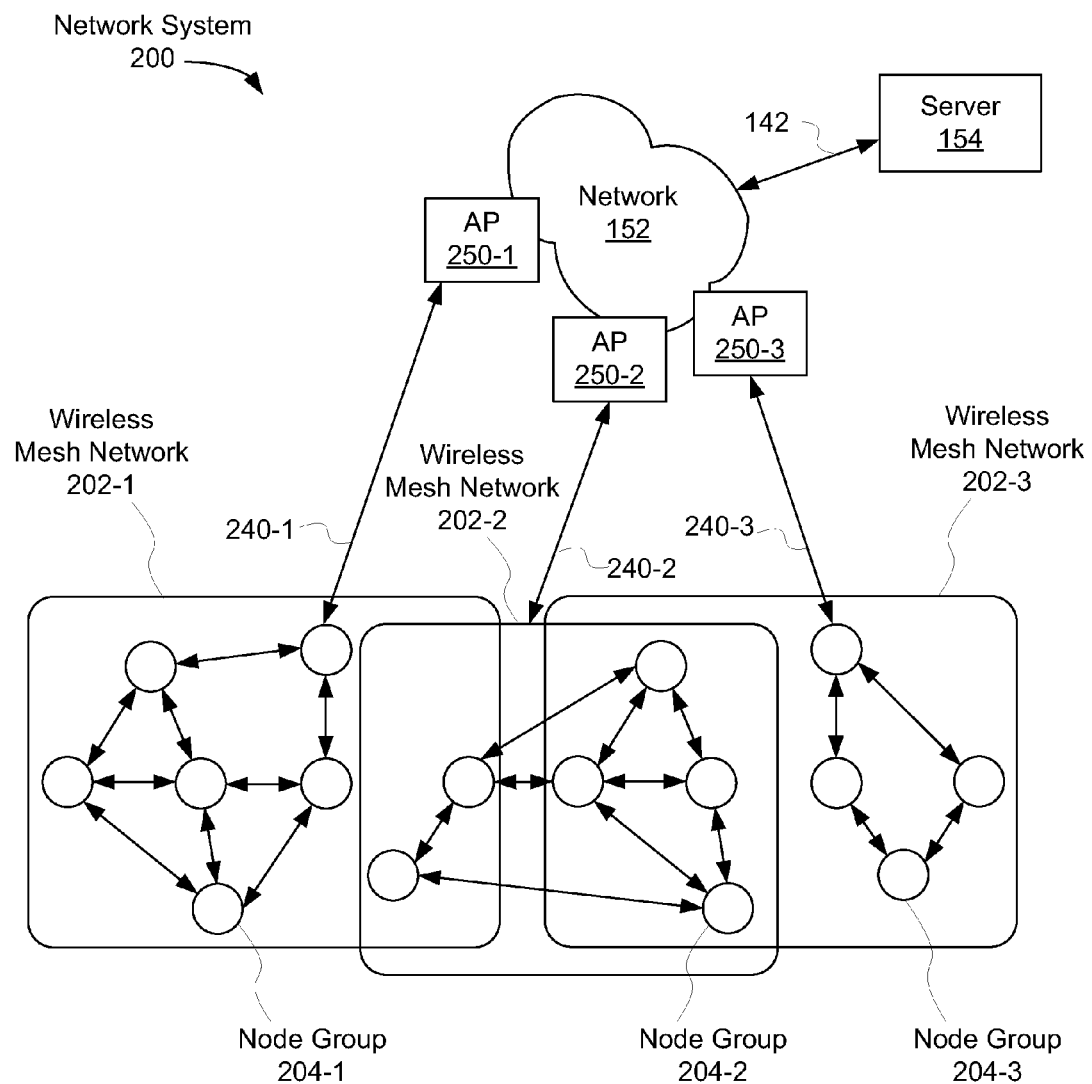
FIG. 2A illustrates a network system with a plurality of access points, according to an alternative embodiment of the invention.

FIG. 2A illustrates a network system 200 with a plurality of access points 250, according to an alternative embodiment of the invention. As shown, the network system 200 comprises one or more wireless mesh networks 202, access points 250, a network 152, and a server 154. Each wireless mesh network 202 includes one or more nodes within a node group 204. The wireless mesh networks 202, access points 250, network 152, server 154, and the nodes within each of the node groups 204 function essentially as discussed above in conjunction with FIG. 1.

In this network system 200, each access point 250 facilitates transmission of payload data for a subset of nodes and the network 152. For example, communications link 240-1 may be established between the access point 250-1 and a node within a node group 204-1 to facilitate transmission of payload data between wireless mesh network 202-1 and network 152. Correspondingly, communications link 240-2 may be established between the access point 250-2 and a node within a node group 204-2 to facilitate transmission of payload data between wireless mesh network 202-2 and network 152. Communications link 240-3 may be established between the access point 250-3 and a node within a node group 204-3 to facilitate transmission of payload data between wireless mesh network 202-3 and network 152. Each access point 250 is coupled to the network 152, which in turn is coupled to the server 154 via communications link 142.

As shown in FIG. 2A, node group 204-1 includes six nodes, node group 204-2 includes six nodes, and node group 204-3 includes four nodes. However, the wireless mesh network 202-1 includes eight nodes; i.e., six nodes from node group 204-1 and two nodes from node group 204-2. Wireless mesh network 202-2 includes six nodes; i.e., the six nodes from node group 204-2. Wireless mesh network 202-3 includes eight nodes; i.e., four nodes from node group 204-2 and four nodes from node group 204-3. It will be appreciated that the wireless mesh networks 202 include each of the nodes within range of a corresponding access point 250. However, nodes within a wireless mesh network 202 may be in range of more than one access point 250 and, therefore, associated with multiple wireless mesh networks 202. In one embodiment, each of the nodes in network system 200 may be configured to select a particular access point 250 with which to establish a communications link. The node may select the access point associated with the shortest hop count between the access point and the node, the access point associated with the greatest path bandwidth for the node, the access point associated with the lowest latency for the node, or any other desirable network metric. Therefore, even though individual nodes in node group 204-2 are within range of one or more of the access points 250, each of the nodes in node group 204-2 establishes a communications path to network 152 via access point 250-2.

Figure 2B:
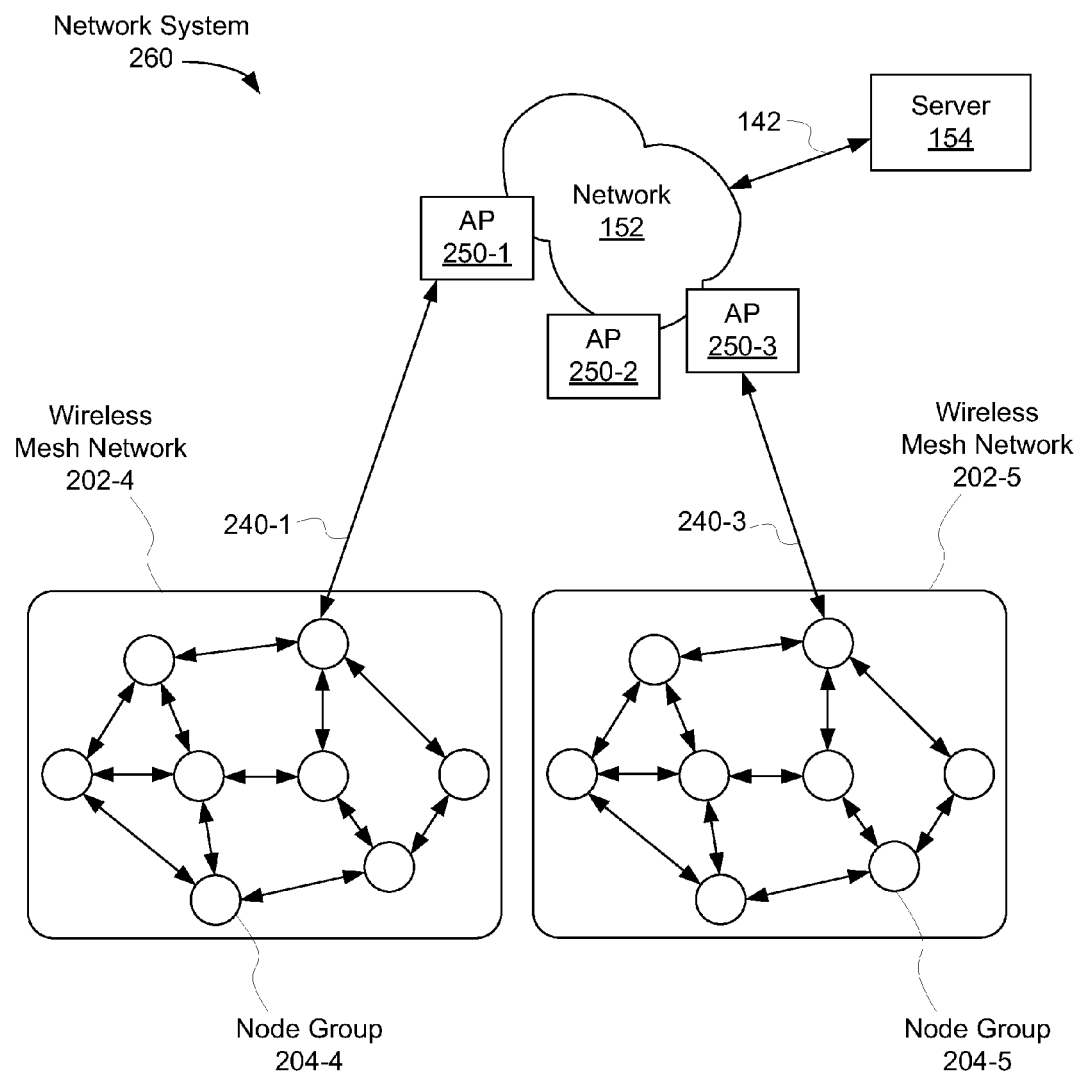
FIG. 2B illustrates a network system with a plurality of access points, according to another alternative embodiment of the invention.

FIG. 2B illustrates a network system 260 with a plurality of access points 250, according to another alternative embodiment of the invention. As shown, the network system 260 comprises one or more wireless mesh networks 202, access points 250, a network 152, and a server 154. Each wireless mesh network 202 includes one or more nodes within a node group 204. The wireless mesh networks 202, access points 250, network 152, server 154, and the nodes within each of the node groups 204 function essentially as discussed above in conjunction with FIGS. 1 and 2A.

In this network system 260, access point 250-2 is not participating within the network system 260. The nodes within access point's 250-2 prior node group 204 have realigned themselves to communicate with neighboring access points 250-1 and 250-3. Accordingly, wireless mesh network 202-4 contains an expanded node group 204-4. Access point 250-1 facilitates transmission of payload data between wireless mesh network 202-4, and network 152 via communications link 240-1. Correspondingly, wireless mesh network 202-5 contains an expanded node group 204-5. Access point 250-3 facilitates transmission of payload data between wireless mesh network 202-5 and network 152 via communications link 240-3. Each active access point 250 is coupled to the network 152, which in turn is coupled to the server 154 via communications link 142. Unlike network system 200 of FIG. 2A, network system 260 of FIG. 2B has a one-to-one correspondence between a node and a particular mesh network 202. In other words, each node within a particular node group 204-4 is associated with one, and only one, active access point 250.

Figure 3:
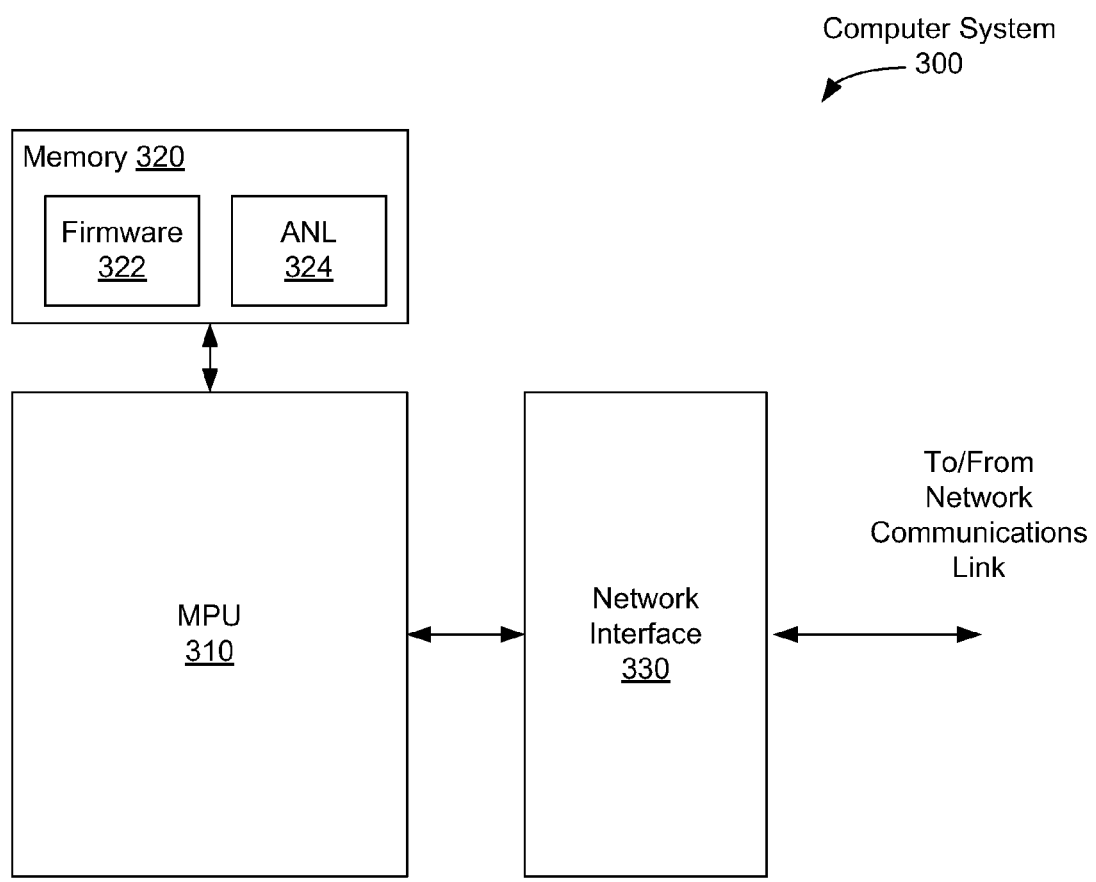
FIG. 3 illustrates a computer system configured to implement one or more aspects of the present invention.

FIG. 3 illustrates a computer system 300 configured to implement one or more aspects of the present invention. Each node 110, 112, 130 and each access point 150, 250 within the wireless mesh network 102, 202 of FIGS. 1-2B typically includes at least one instance of the computer system 300. As shown, the computer system 300 may include, without limitation, a microprocessor unit (MPU) 310, a memory 320, and a network interface 330. In one embodiment, the MPU 310 implements procedures for processing IP packets transmitted or received as payload data by the computer system 300. The procedures for processing the IP packets may include, without limitation, wireless routing, encryption, authentication, protocol translation, and routing between and among different wireless and wired network ports.

A memory 320 may be coupled to the MPU 310 for local program and data storage. As shown in FIG. 3, memory 320 may include firmware 322 and an adjacent node list 324. Firmware 322 is program code and data used to configure computer system 300. In one embodiment, memory 320 may include random access memory (RAM) as well as a non-volatile read-only memory (ROM) such as electrically erasable programmable read-only memory (EEPROM or Flash ROM). Firmware 322 may be stored in the non-volatile read-only memory and is rarely overwritten. Adjacent node list 324 is located in memory 320 and provides a temporary storage of addresses (e.g., MAC addresses, IP addresses, etc.) for up to N adjacent nodes. Each node 110, 130, 112 is configured to discover any other nodes within range of that particular node. The node adds each node within range of that particular node to the adjacent node list 324, storing addresses for up to N adjacent nodes. If there are more than N adjacent nodes within range of that particular node, then the adjacent node list 324 may include the N adjacent nodes associated with the strongest values corresponding to a particular networking metric or the strongest average value for a set of networking metrics. For example, the adjacent node list 324 may only include the nodes with the strongest wireless signal strength. In one embodiment, adjacent node list 324 includes storage for up to 120 addresses for adjacent nodes within the node group 204 associated with computer system 300.

A network interface 330 may be coupled to MPU 310 and configured to implement, without limitation, one or more of the communication links 132, 134, 136, 140. The network interface 330 may utilize any technically feasible network protocol including, without limitation, a WAN or a local-area network (LAN). Moreover, multiple network types may be implemented within a given network interface 330. For example, communications between two nodes 130 or between a node 130 and the corresponding access point 150 may be via a radio-frequency local-area network (RF LAN), while communications between access points 150 and the network 152 may be via a WAN such as a general packet radio service (GPRS) network.

Figure 4:
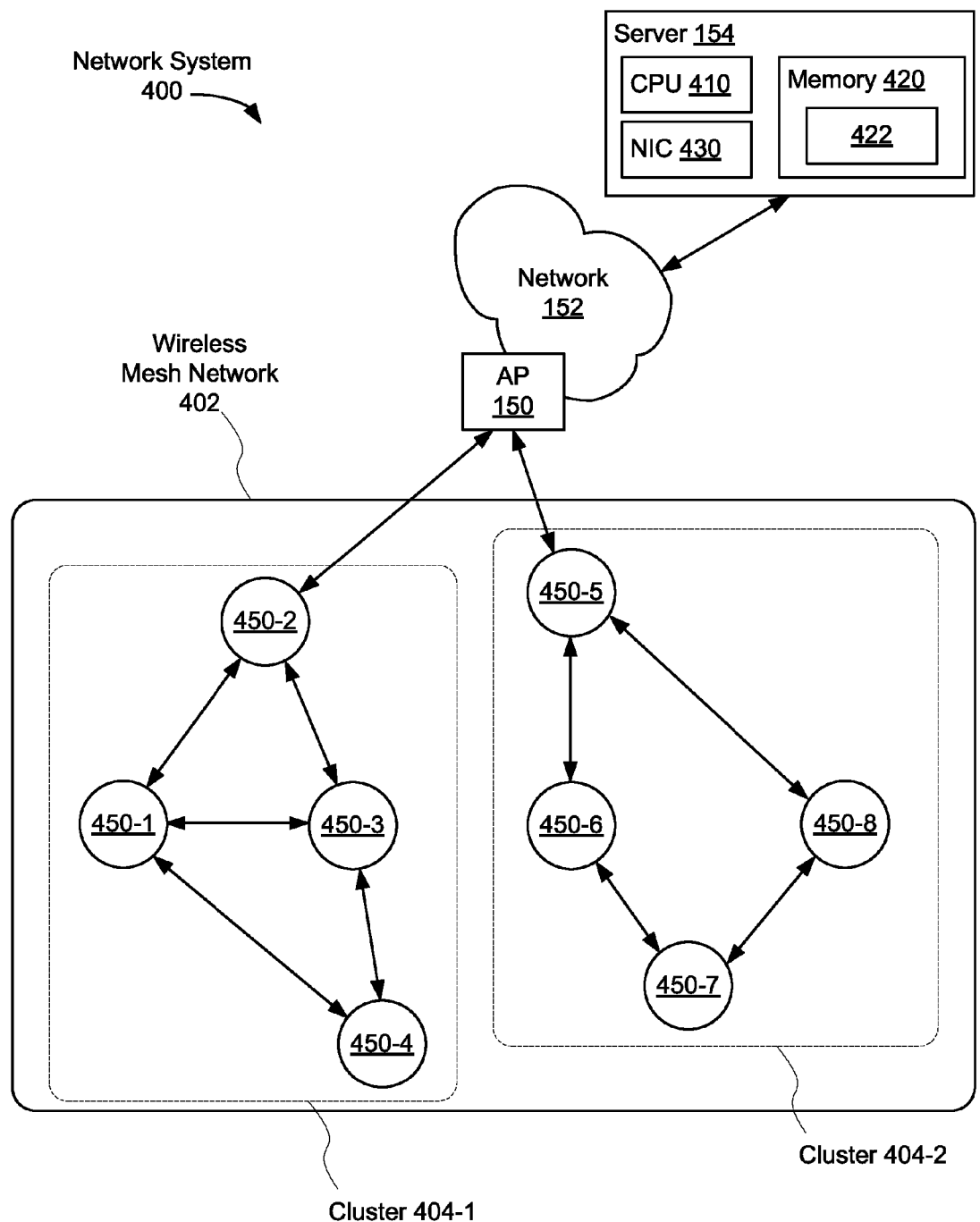
FIG. 4 illustrates network system, according to one embodiment of the invention.

FIG. 4 illustrates network system 400, according to one embodiment of the invention. Server 154, network 152, and access point 150 function essentially as discussed above in conjunction with FIGS. 1-3. Wireless mesh network 402 includes a plurality of nodes 450 function essentially the same as source node 110, intermediate nodes 130, or destination node 112, as discussed above in conjunction with FIGS. 1-3. In one embodiment, server 154 includes a central processing unit (CPU) 410, a memory 420, and a network interface 430. Network interface 430 is similar to network interface 330 of FIG. 3. CPU 410 executes software stored in memory 420 such as an operating system, a graphical user interface, and network management software. Memory 420 also includes an upgrade engine 422 that is configured to update the firmware in each of the nodes 450 of the wireless mesh network 402.

Upgrade engine 422 is configured to efficiently manage upgrading a large number of nodes in an efficient manner. As described above, software updates of a node could be managed by transmitting payload data containing an image of the new software package to each individual node 450 directly from server 154. However, doing so could cause a large increase in network traffic through access point 150 such that normal network operation could be negatively affected. For example, thousands of nodes 450 may be connected to the wireless mesh network 402 through access point 150. Because the software package may be hundreds of kilobytes (kB) or megabytes (MB) in size, thousands or millions of individual copies of the software package transmitted through a single access point 150 would be inefficient.

One conventional solution is to seed a subset of nodes with a copy of the software package and then notify the other nodes in the wireless mesh network 402 that the seed nodes have a copy of the software package, letting the other nodes retrieve the copy of the software package directly from a seed node (or other intermediate node) rather than from the server 154. For example, server 154 may seed 3% of the total number of nodes connected to access point 150 with a copy of the software package, each of the seed nodes being randomly selected from the list of nodes within the wireless mesh network 402. Once each of the seed nodes includes a copy of the software package, a broadcast message could be sent to all of the nodes 450 of the wireless mesh network 402 causing each of the nodes to begin polling adjacent nodes until that node finds an adjacent node that has received a copy of the software package. However, some nodes may be many hops away from a seed node. These nodes may not find that any of their adjacent nodes have received a copy of the software package and, therefore, these nodes continue polling adjacent nodes until at least one of their adjacent nodes receives a copy of the software package. Many times, when polling is not initially successful, the node increases the delay period between polling attempts. Such a system may delay the node from receiving a copy of the software package until days or weeks after the initial seeding of the software package within the wireless mesh network 402.

Furthermore, seeding is typically performed using a random selection algorithm to select the seed nodes from the nodes 450 in the wireless mesh network 402. In some configurations of wireless mesh network 402, some nodes may not be in direct communication with other nodes in the wireless mesh network 402. In other words, a first group of nodes within wireless mesh network 402 may be within range of access point 150 and a second group of nodes within wireless mesh network 402 may also be in range of access point 150, but none of the nodes in the first group of nodes are in direct communication with any of the nodes in the second group of nodes. In such a case, a random seed algorithm may seed a node within the first group and not the second group, which prevents any nodes within the second group from accessing a copy of the software package.

Upgrade engine 422 is configured to efficiently seed the wireless mesh network 402 with copies of the software package using knowledge of the connections between nodes 450 of the wireless mesh network 402 to aid in selecting the seed nodes. In one embodiment, upgrade engine 422 is configured to generate a topological map of the wireless mesh network 402. Upgrade engine 422 is programmed with knowledge of the access points 150 included within network system 400, and includes a list of addresses for each of the access points 150 connected to network 152. Each of the nodes 450 implements a protocol that enables upgrade engine 422 to query the nodes 450 to retrieve information related to the node. One such query, nodeq, transmitted to a node 450 by upgrade engine 422, causes the node 450 to return a list of addresses for all adjacent nodes stored in the adjacent node list 324 for that node 450. Upgrade engine 422 is configured to gather information about each of the nodes 450 included in the wireless mesh network 402 and generate a graph of the wireless mesh network 402. A graph is a data structure that includes vertices (i.e., nodes) and edges (i.e., communication links between two adjacent nodes) in a hierarchical structure that reflects the topology of the wireless mesh network 402.

Figure 5:
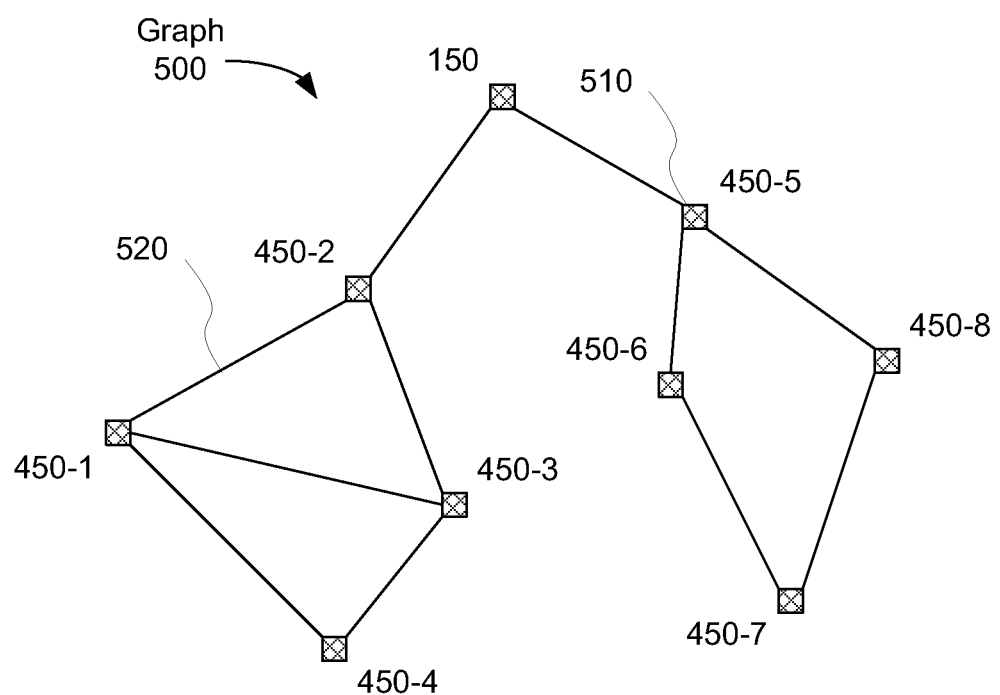
FIG. 5 illustrates a visualization of a graph of wireless mesh network, according to one embodiment of the invention.

FIG. 5 illustrates a visualization of a graph 500 of wireless mesh network 402, according to one embodiment of the invention. As shown, graph 500 includes a plurality of vertices 510 connected by unidirectional edges 520. A vertex 510 is a data structure representing a node 450. In one embodiment, the data structure may include an identifier for the node (node_ID), an address for the node (e.g., MAC address, IP address, etc.), network information related to the node (e.g., network statistics, average latency, minimum hop distance from access point 150, etc.), as well as metadata related to the node. An edge 520 represents a direct communications link between two nodes 450 in the wireless mesh network 402. In other words, an edge 520 represents that a first node is within range of a second node as reflected in each node's adjacent node list 324.

In one embodiment, upgrade engine 422 generates graph 500 via the Java Universal Network/Graph (JUNG) framework. JUNG provides a set of Java classes for generating, manipulating, and visualizing graph data structures. Upgrade engine 422 gathers data from each node 450 using the nodeq query. For example, upgrade engine 422 queries the access point 150 to retrieve a list of nodes 450 connected to the access point 150. For each node 450 connected to the access point 150, upgrade engine 422 transmits a nodeq query to the node 450 to retrieve the adjacent node list 324 for that node 450. As upgrade engine 422 receives responses to the nodeq query, upgrade engine 422 constructs the graph 500 using the classes and methods defined in the JUNG framework. Upgrade engine 422 then queries each of the nodes in the returned adjacent node list 324 that haven't already been queried, continuing to query any additional nodes retrieved in new responses to previous queries.

After the graph 500 has been generated and includes information related to each node within the wireless mesh network 402, upgrade engine 422 analyzes the topology of the network using, at least in part, functions provided within the JUNG framework. One function provided by the JUNG framework is an analysis algorithm for graph clustering. Clustering subdivides a graph data structure into smaller groups of related vertices (i.e., nodes). For example, clustering may analyze the graph 500 to subdivide the nodes into a first cluster 404-1 and a second cluster 404-2, as shown in FIG. 4. By analyzing the unidirectional edges that represent the adjacencies between nodes 450, upgrade engine 422 may split the plurality of nodes 450 in the wireless mesh network 402 into groups of related nodes (i.e., clusters). Within each cluster 404, upgrade engine 422 can guarantee that each node 450 within the cluster 404 is connected by one or more communication paths to every other node 450 within the cluster 404. Thus, when seeding nodes within wireless mesh network 402, upgrade engine 422 is aware of the network topology and can avoid a random seeding that could result in the failure of some nodes 450 to reach a copy of the software package.

Returning now to FIG. 4, an upgrade operation performed by upgrade engine 422 will be described. Once upgrade engine 422 has generated the topological map of wireless mesh network 402 and subdivided the nodes 450 into one or more clusters 404, as shown in FIG. 4, upgrade engine 422 performs a seeding operation by transmitting a copy of the software package to a subset of nodes within each cluster 404. In one embodiment, upgrade engine 422 is configured to upgrade the firmware 322 for each of the nodes 450 in wireless mesh network 402. For each cluster 404, upgrade engine 422 selects a number of seed nodes from the cluster 404. For example, upgrade engine 422 may be configured to select at least 3% of the nodes 450 within each cluster as seed nodes. As shown in FIG. 4, the first cluster 404-1 includes four nodes 450-1, 450-2, 450-3, and 450-4. Thus, upgrade engine 422 may select one of these four nodes as a seed node. For example, upgrade engine 422 may select node 450-3 as a seed node within the first cluster 404-1. Similarly, upgrade engine 422 may select node 450-5 as a seed node within the second cluster 404-2. Then, upgrade engine 422 transmits a copy of the software package (e.g., an image of the updated firmware) to each of the seed nodes 450-3 and 450-5. In one embodiment, upgrade engine 422 may select the nodes within the cluster at random. In another embodiment, upgrade engine 422 may analyze network statistics or topology to select the seed nodes.

Once the copy of the software package has been transmitted to the seed nodes, upgrade engine 422 notifies each adjacent node included in the adjacent node lists 324 of the seed nodes 450-3, 450-5 to begin polling the wireless mesh network 402 to locate a copy of the software package. As shown in FIG. 4, seed node 450-3 is adjacent to each of nodes 450-1, 450-2, and 450-4. In contrast, seed node 450-5 is adjacent to nodes 450-6 and 450-8 but not node 450-7. Thus, upgrade engine 422 does not immediately notify node 450-7 to begin polling the network. The notified nodes (i.e., nodes 450-1, 450-2, 450-4, 450-6, and 450-8) begin polling any nodes in their corresponding adjacent node lists 324 attempting to locate a copy of the software package. Once the notified nodes locate a seed node (i.e., 450-3, 450-5), the notified nodes begin downloading the copy of the software package from the seed node.

Once the copy of the software package has been stored in a notified node, upgrade engine 422 determines the adjacent nodes to that particular notified node and further notifies any of the adjacent nodes to that particular notified node to begin polling the network to locate a copy of the software package. For example, once node 450-2 has received a copy of the software package from seed node 450-3, upgrade engine 422 determines whether any adjacent nodes in the adjacent node list 324 of node 450-2 have not been notified. Because each of the adjacent nodes to node 450-2 have already been notified to begin polling the network to locate a copy of the software package, upgrade engine 422 does not notify any additional nodes 450. However, in contrast, once node 450-6 has received a copy of the software package from seed node 450-5, upgrade engine 422 notifies node 450-7 to begin polling the network. In this manner, the copy of the software package propagates through each of the nodes 450 within the wireless mesh network 402.

Figure 6A:
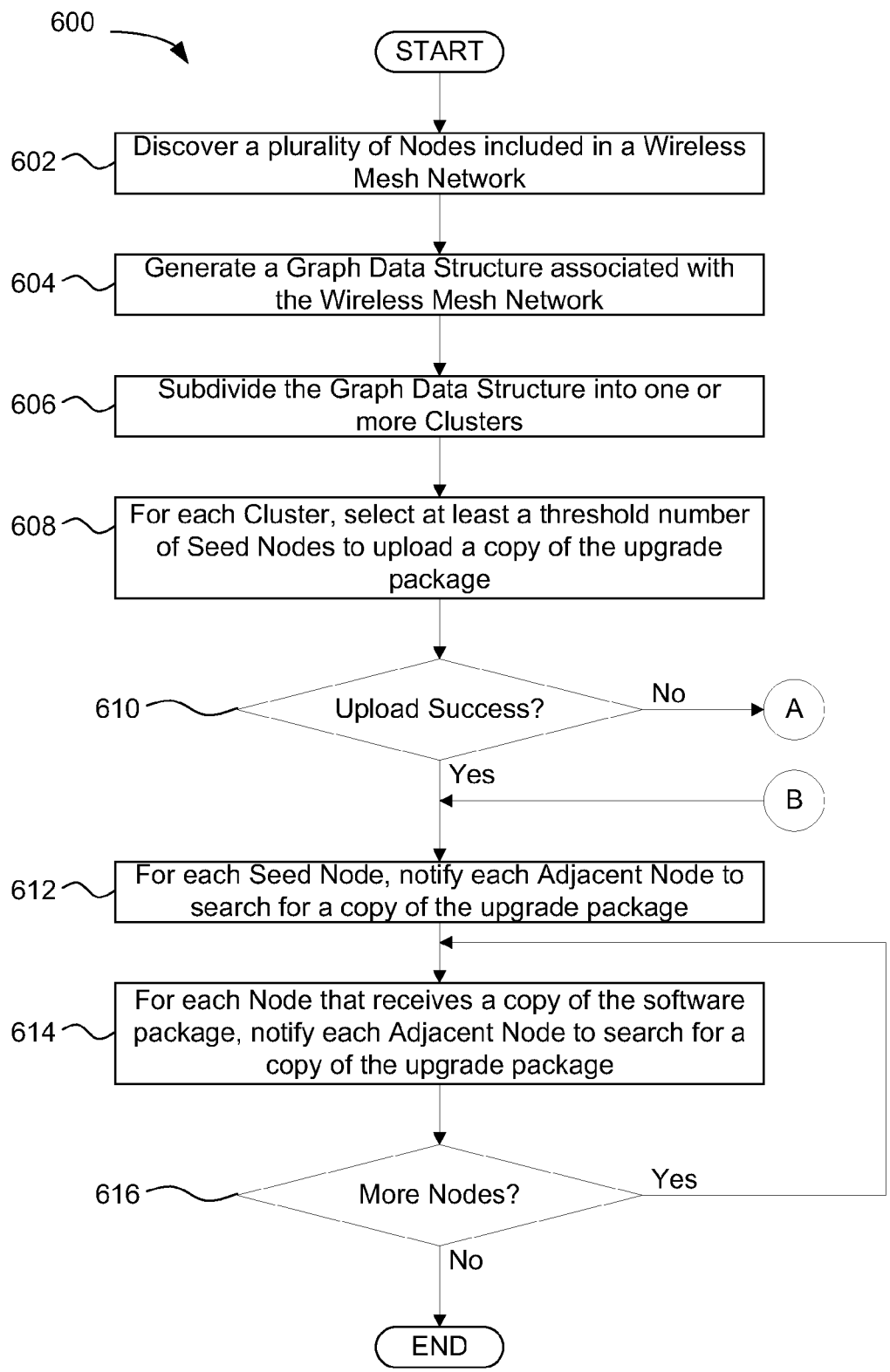
FIGS. 6A and 6B set forth flow diagrams of method steps for updating the firmware for nodes within a wireless mesh network, according to one embodiment of the invention.
Figure 6B:
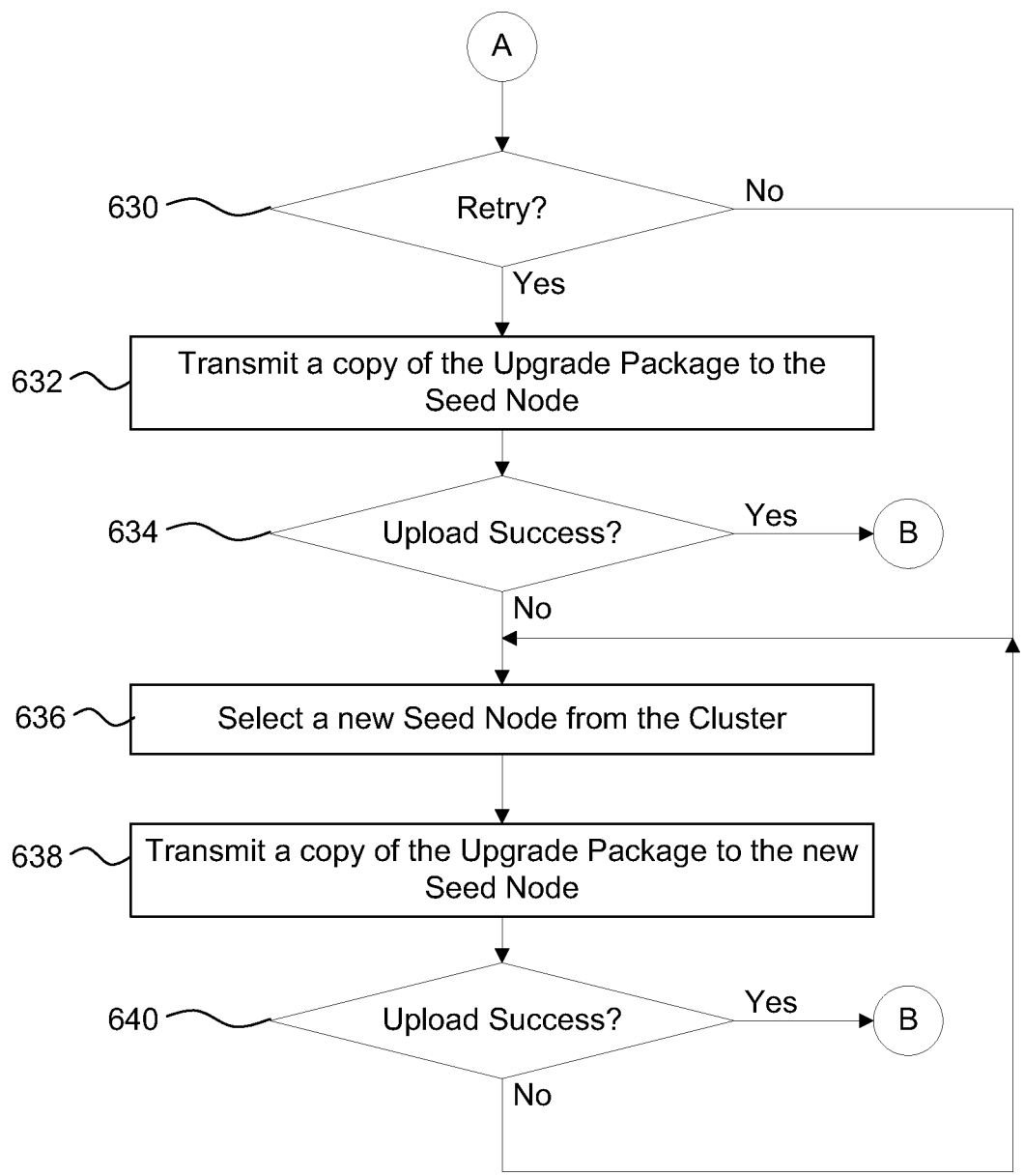

FIGS. 6A and 6B set forth flow diagrams of method steps for updating the firmware 322 for nodes 450 within a wireless mesh network 402, according to one embodiment of the invention. Although the method steps are described in conjunction with the systems of FIGS. 1-5, persons of ordinary skill in the art will understand that any system configured to perform the method steps, in any order, is within the scope of the present invention.

As shown, a method 600 begins at step 602, where upgrade engine 422 discovers a plurality of nodes 450 included in a wireless mesh network 402. Upgrade engine 422 may query the access point 150 associated with the wireless mesh network 402 to determine whether any nodes 450 are within range of the access point 150. In one embodiment, the access point 150 may store a list of all nodes 450 within range of the access point 150 and return the list to upgrade engine 422. Upgrade engine 422 may query each node in the list to determine the adjacent nodes for the nodes returned in the list. Then, for each response to the query received by upgrade engine 422, upgrade engine 422, may query each additional node 450 included in the response, and so forth until upgrade engine 422 has compiled a list of every node 450 within the wireless mesh network 402. In another embodiment, the access point 150 may broadcast a message to every node 450 within range of the access point 150. Upon receiving the broadcast message, the nodes 450 may forward the broadcast message on to every node 450 within their corresponding adjacent node list 324. In addition, the node 450 may respond to the broadcast message by transmitting a response to upgrade engine 422 that includes information about the node 450 and the adjacent node list 324 for that node 450. Eventually, every node in the wireless mesh network 402 receives the broadcast message and transmits a response to upgrade engine 422.

At step 604, upgrade engine 422 generates a graph 500 associated with the wireless mesh network 402. In one embodiment, upgrade engine 422 creates graph 500 using the JUNG framework. For each response received in step 602, upgrade engine 422 adds a vertex 510 to the graph 500 associated with the node 450 corresponding to the response. Upgrade engine 422 also adds an edge 520 to the graph 500 associated with the node 450 and any adjacent nodes 450 included in the adjacent node list 324 included in the response. At step 606, upgrade engine 422 subdivides the graph 500 into one or more clusters 404. Upgrade engine 422 analyzes the graph 500 and determines a division of the nodes 450 based on the topology of the wireless mesh network 402. Each of the clusters 404 includes a plurality of nodes 450 that can communicate with each of the other nodes 450 within the cluster 404.

At step 608, for each cluster 404 within the wireless mesh network 402, upgrade engine 422 selects a subset of nodes 450 within the cluster 404 to act as seed nodes and transmits a copy of the software package (e.g., an image of the new firmware 322) to each of the seed nodes in the cluster 404. In one embodiment, for each cluster 404 within the wireless mesh network 402, upgrade engine 422 selects a threshold number of seed nodes within the cluster 404 and transmits the copy of the software package to each of the seed nodes. The threshold number of seed nodes may be based on the total number of nodes in a given cluster 404. For example, upgrade engine 422 may be configured to seed at least 3% of the nodes within a cluster 404. Thus, if a first cluster 404-1 includes 2500 nodes, upgrade engine 422 selects at least 75 nodes as seed nodes. Upgrade engine 422 selects the seed nodes at random within each cluster 404 in order to distribute the seed nodes throughout the cluster 404. In other words, random selection of seed nodes helps to spread the copies of the software package randomly throughout the cluster 404 such that the number of hops between the seed nodes and the other nodes 450 is reduced. Upgrade engine 422 selects at least one node from each cluster 404, regardless of the number of nodes within the cluster 404. In an alternative embodiment, upgrade engine 422 may select up to M nodes in each cluster 404 as seed nodes, ensuring that every cluster 404 in the wireless mesh network 102 includes at least M seed nodes.

At step 610, for each seed node selected in step 608, upgrade engine 422 determines whether the upload of the software package to the seed node was a success. In one embodiment, the software package is split into one or more chunks that are transmitted to the nodes 450 in smaller packets. For each chunk of the software package, upgrade engine 422 transmits the chunk to the node 450 and awaits an acknowledgment message from the node 450 that the transmission was successful. Once an acknowledgment message is received for a chunk, the next chunk is transmitted to the node 450. Once all of the chunks for the software package have been successfully transmitted to the node 450, upgrade engine 422 transmits an instruction to the node causing the node 450 to restart using the new software package. For example, when the software package is a firmware upgrade, upgrade engine 422 transmits an instruction that causes the node 450 to re-flash the non-volatile memory with the image of the firmware 322. If the flash operation is successful, then upgrade engine 422 instructs the node 450 to reboot using the new version of the firmware 322. After the node 450 has rebooted, upgrade engine 422 queries the node 450 to determine whether the upload was successful. If each of these operations passes, then the upload was successful and method 600 proceeds to step 612. However, if any of the operations fails (i.e., upgrade engine 422 fails to receive an acknowledgment message after transmitting one chunk to the node 450, the flash operation is not successful, or the node 450 does not reboot properly), then the upload was unsuccessful and method 600 proceeds to step 630 of FIG. 6B where upgrade engine 422 executes an error handling routine.

Returning to step 612, having successfully uploaded the software package to one or more seed nodes, upgrade engine 422 notifies each of the adjacent nodes included in the adjacent node list 324 for each of the seed nodes to begin searching for a copy of the software package. Because each of the seed nodes include a copy of the software package in memory 320, each adjacent node to one of the seed nodes should have at least one node included in the adjacent node list 324 that stores a valid copy of the software package. It will be appreciated that a particular node may have multiple seed nodes listed in the adjacent node list 324 and, therefore, may be able to retrieve the copy of the software package from any of the seed nodes in the adjacent node list 324 (or any of the other nodes in the adjacent node list 324 that have already retrieved the copy of the software package from a seed node). At step 614, for each node that successfully locates and downloads a copy of the software package, upgrade engine 422 notifies each of the adjacent nodes included in the adjacent node list 324 for each of the successful nodes to search for a copy of the software package.

At step 616, upgrade engine 422 determines whether every node in the wireless mesh network 402 has received a copy of the software package. If there is at least one node that has not received a copy of the software package, then method 600 returns to step 614 where upgrade engine 422 notifies additional nodes to begin searching for a copy of the software package. It will be appreciated that the software package originally transmitted to one or more seed nodes will quickly propagate from the seed nodes to each and every node 450 within a cluster 404 as each node successfully copies the software package from at least one adjacent node. Returning to step 616, if each node within the wireless mesh network 402 has successfully received a copy of the software package, then method 600 terminates.

In some embodiments, upgrade engine 422 may track the failures of nodes that cannot locate a copy of the software package in any adjacent node included in that node's adjacent node list 324. Because upgrade engine 422 manages when a notification is sent to a node 450 to begin searching for a copy of the software package, upgrade engine 422 is aware that at least one node adjacent to a particular node should have a local copy of the software package. Upgrade engine 422 is also aware of approximately how long the transfer process should take to download a copy of the software package from one node to another node. Therefore, upgrade engine 422 may implement a delay period measured from the time a notification is sent to a node 450 to begin searching for a copy of the software package. Once the delay period expires, upgrade engine 422 may query the node 450 to determine whether the node 450 successfully located a copy of the software package. If the node 450 failed to locate a copy of the software package (e.g., because of local communications failures between the node and a seed node), then upgrade engine 422 may mark the node 450 as having failed. In one embodiment, upgrade engine 422 handles failures by transmitting the copy of the software package directly to the node 450 from server 154. In this manner, upgrade engine 422 ensures that every node 450 within wireless mesh network 402 receives a copy of the software package.

Returning now to step 610, if uploading the software package to a seed node was not successful, then method 600 proceeds to step 630, shown in FIG. 6B. At step 630, upgrade engine 422 determines whether to retry uploading the copy of the software package to the seed node. If the upload operation is retried, then method 600 proceeds to step 632 where upgrade engine 422 again attempts to transmit the copy of the software package to the seed node. In one embodiment, upgrade engine 422 may be configured to retry the upload to the selected seed node one or more times in the event of a transmission failure. At step 634, upgrade engine 422 determines whether the upload was a success. If the upload was a success, then method 600 proceeds to step 612, shown in FIG. 6A. However, if the upload failed, then method 600 proceeds to step 636 where upgrade engine 422 selects a new seed node from the cluster 404. It will be appreciated that at certain times, network failures may occur that prevent a particular seed node from receiving a copy of the software package directly from server 154. In this event, upgrade engine 422 may simply select a new seed node within the cluster to replace the seed node associated with the failure.

At step 638, upgrade engine 422 transmits the copy of the software package to the new seed node. At step 640, upgrade engine 422 determines whether the upload was a success. If the upload was a failure, then method 600 returns to step 636 and a new seed node is selected. However, if the upload was a success, then method 600 proceeds to step 612, shown in FIG. 6A.

In sum, the disclosed technique provides an improved way for updating the nodes of a wireless mesh network. Specifically, an upgrade engine executing on a server connected to the wireless mesh network determines a topology of the network, subdivides the network into a plurality of clusters based on the topology of the network, and seeds a small number of nodes within each cluster. The upgrade engine manages the upgrade process, notifying particular nodes within each cluster when to search for an upgrade package (e.g., an image of a new firmware) stored in an adjacent node.

Advantageously, managing the search process for each of the nodes at a central location enables the firmware upgrade software to deal with network failures as they occur, directly transmitting a copy of the upgrade package to any nodes that cannot locate a copy of the upgrade package from another node in the wireless mesh network. This central management function reduces the time for upgrading every node within the wireless mesh network and ensures full deployment of the upgrade without large increases in network traffic at the access points or long delays due to inefficient propagation of the upgrade package within the wireless mesh network.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for upgrading nodes within a network, the method comprising:
   discovering a plurality of nodes connected to the network;
   dividing the plurality of nodes into two or more clusters of nodes based on a topology of the network, wherein each node within a particular cluster of nodes is able to communicate with each of the other nodes within the particular cluster of nodes; and
   for each cluster of nodes:
      selecting a subset of seed nodes within the cluster of nodes,
      transmitting a software update to a first seed node in the subset of seed nodes, and
      for a second node within the cluster of nodes:
         notifying the second node that at least one node in the plurality of nodes has a copy of the software update, and
         causing the second node to begin polling nodes in the cluster of nodes in response to the notification in order to locate a node that has a copy of the software update.

2. The method of claim 1, further comprising, for the second node within the cluster of nodes:
   determining that the second node has successfully received the software update from the first seed node;
   notifying a third node associated with the second node that at least one node in the plurality of nodes has a copy of the software update; and
   causing the second node to begin polling nodes in the cluster of nodes in response to the notification in order to locate a node that has a copy of the software update.

3. The method of claim 1, further comprising, for the second node within the cluster of nodes:
   determining that the second node has failed to locate a copy of the software update; and
   transmitting the software update to the second node directly from a server.

4. The method of claim 1, wherein the software update comprises an image of a new version of firmware.

5. The method of claim 1, wherein dividing the plurality of nodes into two or more clusters of nodes comprises:
   generating a graph data structure that represents the topology of the network;
   analyzing the graph data structure; and
   dividing the plurality of nodes into the two or more clusters of nodes based on the analysis of the graph data structure.

6. The method of claim 5, wherein the graph data structure is generated and analyzed via a Java Universal Network/Graph (JUNG) framework.

7. The method of claim 1, wherein the network comprises a wireless mesh network.

8. The method of claim 1, wherein the network comprises a general packet radio service (GPRS) network.

9. A non-transitory computer-readable medium including instructions that, when executed by a processing unit, cause the processing unit to upgrade nodes within a network, by performing the steps of:
   discovering a plurality of nodes connected to the network;
   dividing the plurality of nodes into two or more clusters of nodes based on a topology of the network, wherein each node within a particular cluster of nodes is able to communicate with each of the other nodes within the particular cluster of nodes; and
   for each cluster of nodes:
      selecting a subset of seed nodes within the cluster of nodes,
      transmitting a software update to a first seed node in the subset of seed nodes, and
      for a second node within the cluster of nodes:
         notifying the second node that at least one node in the plurality of nodes has a copy of the software update, and
         causing the second node to begin polling nodes in the cluster of nodes in response to the notification in order to locate a node that has a copy of the software update.

10. The computer-readable medium of claim 9, the steps further comprising, for the second node within the cluster of nodes:
    determining that the second node has successfully received the software update from the first seed node;
    notifying a third node associated with the second node that at least one node in the plurality of nodes has a copy of the software update; and
    causing the second node to begin polling nodes in the cluster of nodes in response to the notification in order to locate a node that has a copy of the software update.

11. The computer-readable medium of claim 9, the steps further comprising, for the second node within the cluster of nodes:
    determining that the second node has failed to locate a copy of the software update; and
    transmitting the software update to the second node.

12. The computer-readable medium of claim 9, wherein the software update comprises an image of a new version of firmware.

13. The computer-readable medium of claim 9, wherein dividing the plurality of nodes into two or more clusters of nodes comprises:
    generating a graph data structure that represents a topology of the network;
    analyzing the graph data structure; and
    dividing the plurality of nodes into the two or more clusters of nodes based on the analysis of the graph data structure.

14. The computer-readable medium of claim 13, wherein the graph data structure is generated and analyzed via a Java Universal Network/Graph (JUNG) framework.

15. The computer-readable medium of claim 9, wherein the network comprises a wireless mesh network.

16. The computer-readable medium of claim 9, wherein the network comprises a general packet radio service (GPRS) network.

17. A computing device comprising:
    a processor configured to upgrade nodes within a network, by performing the steps of:
       discovering a plurality of nodes connected to the network;
       dividing the plurality of nodes into two or more clusters of nodes based on a topology of the network, wherein each node within a particular cluster of nodes is able to communicate with each of the other nodes within the particular cluster of nodes; and
       for each cluster of nodes:
          selecting a subset of seed nodes within the cluster of nodes,
          transmitting a software update to a first seed node in the subset of seed nodes, and for a second node within the cluster of nodes:
- notifying the second node that at least one node in the plurality of nodes has a copy of the software update, and
- causing the second node to begin polling nodes in the cluster of nodes in response to the notification in order to locate a node that has a copy of the software update.

18. The computing device of claim 17, wherein the processing unit is further configured to perform the steps of, for the second node within the cluster of nodes:
- determining that the second node has successfully received the software update from the first seed node; and
- notifying a third node associated with the second node that at least one node in the plurality of nodes has a copy of the software update; and
- causing the second node to begin polling nodes in the cluster of nodes in response to the notification in order to locate a node that has a copy of the software update.

19. The computing device of claim 17, wherein the processing unit is further configured to perform the steps of, for the second node within the cluster of nodes:
- determining that the second node has failed to locate a copy of the software update; and
- transmitting the software update to the second node from the computing device.

20. The computing device of claim 17, wherein the network comprises a general packet radio service (GPRS) network.

21. The method of claim 1, further comprising, for the second node within the cluster of nodes:
- determining that the second node has successfully received the software update from the first seed node; and
- classifying the second node as a seed node.

* * * * *

UNITED STATES PATENT AND TRADEMARK OFFICE
CERTIFICATE OF CORRECTION

| | | |
|---|---|---|
| PATENT NO. | : 9,081,643 B2 | Page 1 of 1 |
| APPLICATION NO. | : 13/624837 | |
| DATED | : July 14, 2015 | |
| INVENTOR(S) | : Jennifer Wang and Evan McClure | |

It is certified that error appears in the above-identified patent and that said Letters Patent is hereby corrected as shown below:

Title Page

(73) Assignee:

Please delete "Silver Sring Networks, Inc." and insert --Silver Spring Networks, Inc.--.

Signed and Sealed this
Fifth Day of April, 2016

Michelle K. Lee
*Director of the United States Patent and Trademark Office*